March 17, 1942.    N. G. CARLSON    2,277,014
RAIL BONDING APPARATUS
Filed July 6, 1940    2 Sheets-Sheet 1

INVENTOR.
NOBLE G. CARLSON
BY Oberlin, Limbach & Day
ATTORNEYS.

March 17, 1942.                N. G. CARLSON                2,277,014
                            RAIL BONDING APPARATUS
                             Filed July 6, 1940                2 Sheets-Sheet 2

INVENTOR.
NOBLE G. CARLSON
BY Oberlin, Limbach & Day
ATTORNEYS

Patented Mar. 17, 1942

2,277,014

UNITED STATES PATENT OFFICE 2,277,014

RAIL BONDING APPARATUS

Noble G. Carlson, Cleveland Heights, Ohio, assignor to The Electric Railway Improvement Company, Cleveland, Ohio, a corporation of Ohio Application July 6, 1940, Serial No. 344,267

15 Claims. (Cl. 22—116)

The present invention relating as indicated to rail bonding apparatus, has more particular regard to an apparatus for attaching such bonds by a cast welding method, wherein molten metal, e. g., copper, is supplied to a mold cavity into which the end of the bond projects, such metal being of sufficient volume and such temperature as to cause a firm union between the bond and the face of the rail or other metal part to which the bond is to be attached. Still more particularly the present improved apparatus is designed for use in thus attaching bonds to rails or the like where the weld metal is produced by an aluminothermic reaction at the place of operation.

One principal object of the present improvement is to provide an apparatus which will be simple and compact and sufficiently light so that it will be readily portable from place to place along a rail line, for example. A further object is to provide an apparatus that may be manually operated with a minimum of effort. Still another object is to provide a mold of special design which will not only insure the casting of a terminal that will provide a satisfactory union between the bond and rail, but permit the apparatus to be readily detached after the casting operation, as well as segregate from the bond terminal proper in form convenient for removing any surplus metal and slag that may result from the casting or welding operation.

To the accomplishment of the foregoing and related ends, said invention, then, consists of the means hereinafter fully described and particularly pointed out in the claims, the annexed drawings and the following description setting forth in detail certain means and one mode which illustrate, however, but one of the various ways in which the principle of the invention may be used.

Figure 1:
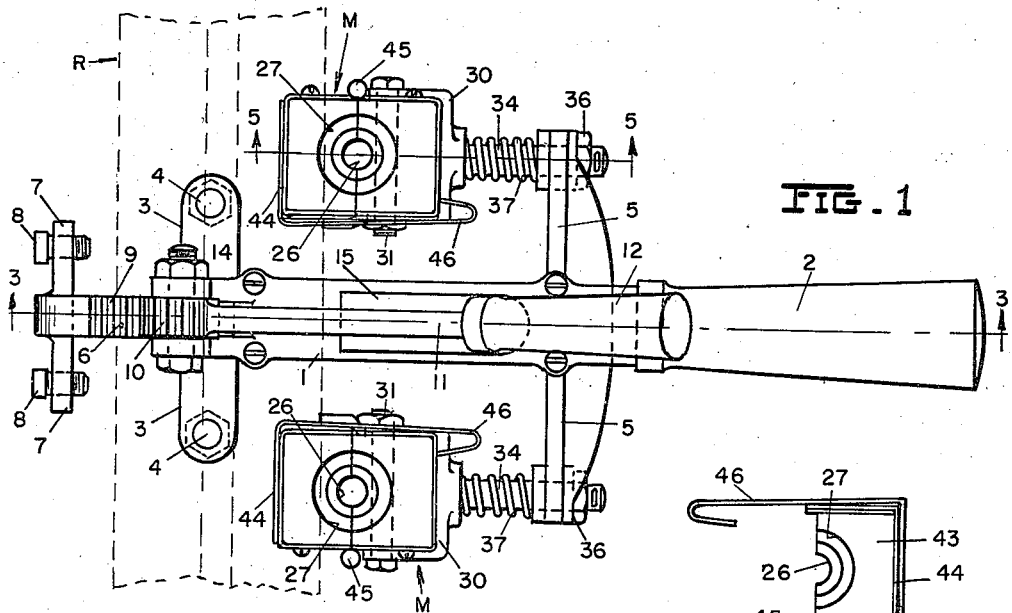
Fig. 1 is a top plan view of one form of my improved apparatus.

While not limited to any specific field of use, the apparatus of the present invention, as indicated above, is primarily designed for cast welding bond terminals to rails, and this is the form of the apparatus illustrated in the several figures of the drawings. Furthermore, since rail bonds, whether signal bonds or so-called transit bonds, are ordinarily designed to have their respective ends attached to juxtaposed rail ends, the apparatus thus illustrated is provided with two molds to receive the respective ends and operate upon both ends of such relatively short or close-coupled bond. However, it will be understood that the apparatus may be used or readily adapted for use in attaching single ends of crossover bonds or other more extended types of electrical conductors.

Referring specifically to the apparatus illustrated in the drawings, the main element of such apparatus will be seen to be a frame 1 of hollow box-like form which is provided at its one end with a handle 2. Adjacent the end of the frame opposite such handle it is provided with two oppositely directed arms 3, in the outer ends of which in turn are mounted adjustable bearing members, such as set screws 4, whereby this end of the frame may be adjustably supported on the top surface of a rail head R or like part to which the bond is to be attached. Intermediately of handle 2 and these arms 3 the frame is provided with another pair of oppositely directed arms 5, the outer ends of which turn downwardly and serve as means of support for each of the molds M as will be presently described in detail.

Figure 2:
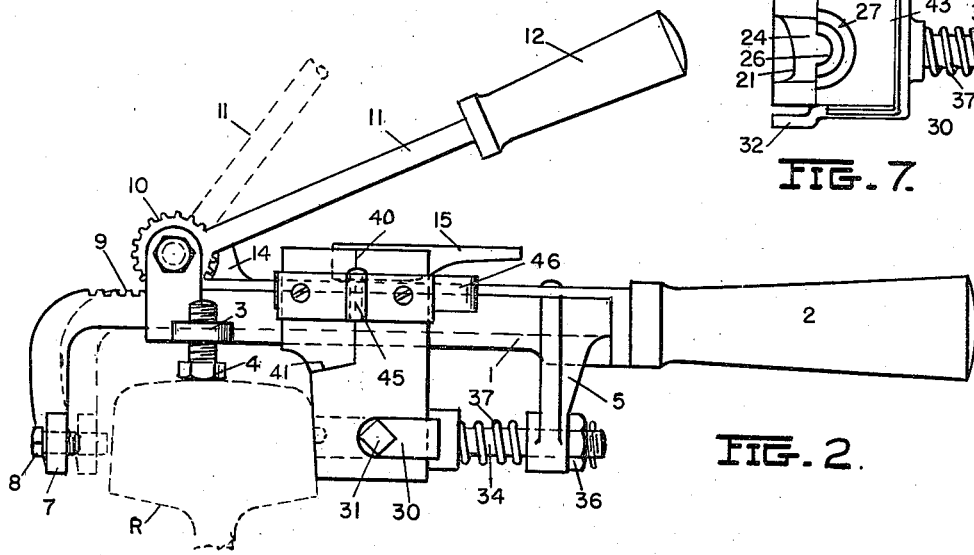
Fig. 2 is a side elevation of the same.
Figure 3:
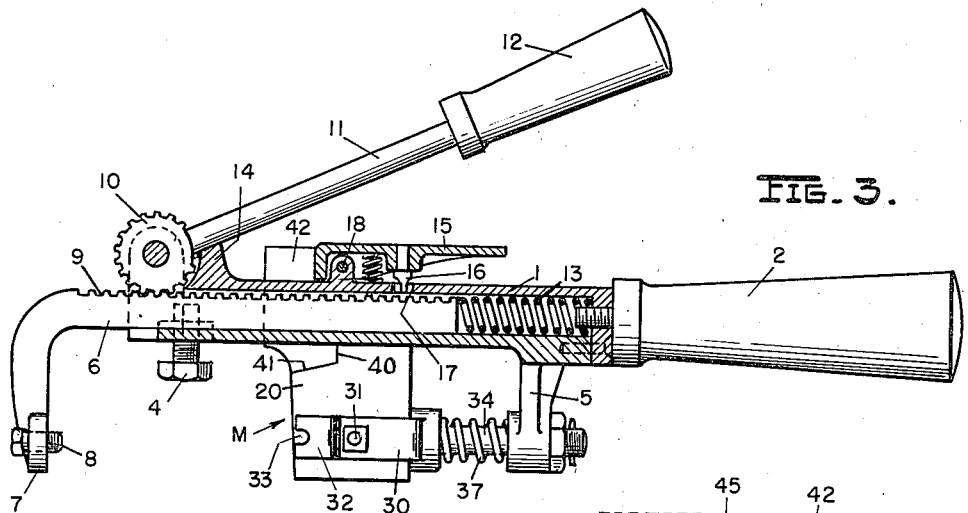
Fig. 3 is a central vertical section thereof taken on the plane indicated by the line 3—3 on Fig. 1.

Mounted in the frame 1 so as to be longitudinally reciprocable thereof is a rack member 6, the projecting end of which is bent downwardly and provided with oppositely directed arms 7 which lie parallel with one face of the rail head R when the frame is disposed transversely of such rail head, as shown in Figs. 1 and 2. An adjustable contact member, such as a set screw 8, is provided near the end of each such arm 7 to contact with the face of the rail head. The portion of member 6 which is slidably held in frame 1 is provided with a series of rack teeth 9 on its upper face, these teeth being engaged at one point by a pinion 10 oscillatorily mounted on the inner end of frame 1. Projecting radially from such pinion is a rod 11 provided with a handle 12, upon movement of which in a counter-clockwise direction the rack member 6 will be moved to the right, as viewed in Figs. 1, 2 and 3. A compression spring 13 is inserted between the handle end of frame 1 and the adjacent end of rack member 6 so that the latter is normally urged in the opposite direction; however, a projection 14 on the upper face of the frame 1 serves as a stop against which handled rod member 11 normally rests, thus limiting the extent of the movement of the rack member produced by said spring 13.

Pivotally mounted at an intermediate point on the upper frace of frame 1 is a trigger 15 that is provided on its under face with a latch or keeper 16 which is adapted to project through an aligned opening 17 in the frame to engage the rack on member 6. A compression spring 18 normally retains the trigger and such latch inoperative, but the latter may be readily brought into engagement with the rack member by pressing downwardly on the end of the trigger which lies conveniently adjacent the handle 2 on the frame.

The construction of the two molds M is identical except for the direction in which certain recesses therein are adapted to receive the opposite ends of the bond. Since such rail bond ends are, of course, oppositely disposed, these recesses on the rail-contacting faces of the molds will be reversely disposed.

Each of these molds comprises a block 20 of suitable refractory material, preferably graphite, such block having a recessed face that conforms to the face of the rail R to which the bond is to be attached. The recess in such mold face in turn comprises a main cavity 21, wherein the bond terminal *b* is cast, and a smaller cavity 22 extending to an adjacent side of the mold and adapted closely to fit the body of the bond B (see Fig. 9) with its end extending into such main cavity. Included in the upper portion of the mold and preferably formed out of the same block of material is a crucible 23 which is adapted to receive a charge of alumino-thermic reaction powder which, upon ignition, will produce a suitable charge of molten metal for casting the bond terminal in the cavity 21. Connecting the latter with such crucible is a relatively large sprue passage 24, the connection between such passage and the cavity being constricted as shown at 25 in Fig. 5, and the connection of such sprue passage with the bottom of the crucible being likewise constricted, as shown at 26 in the same figure. Where an alumino-thermic reaction mixture is employed to produce the charge of molten metal, the connection 26 between the crucible and the sprue passage will desirably be closed by a fusible plug 27 which will not release the charge of molten metal until the reaction in the crucible is substantially complete. However, it will be understood that molten metal otherwise derived than by such alumino-thermic reaction may be supplied to the mold cavity 21 through the sprue passage 24.

Figure 5:
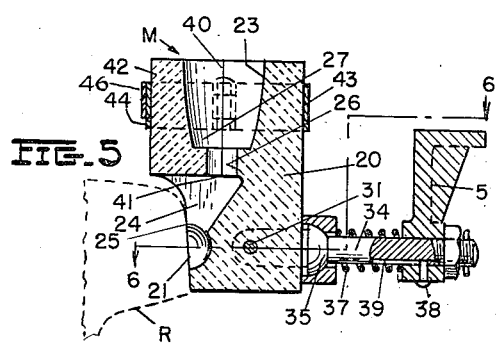
Fig. 5 is a vertical section through one of the molds which form a part of the apparatus, the plane of such section being indicated by the line 5—5 on Fig. 1.
Figure 6:
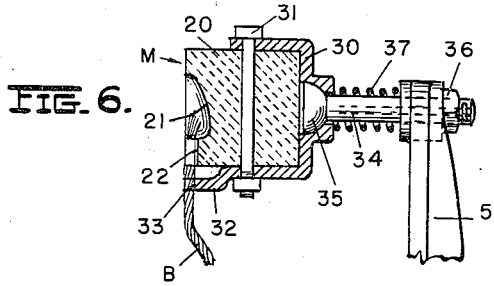
Fig. 6 is a transverse section through such mold, the plane of the section being indicated by the line 6—6 on Fig. 5.
Figure 4:
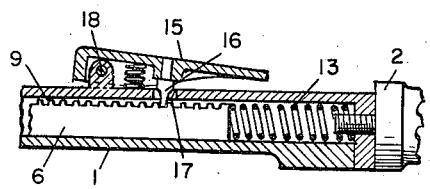
Fig. 4 is a sectional detail view taken on the same plane as Fig. 3, but showing certain parts in a different operative position.

The block 21 comprising each mold is adjustably secured to the corresponding arm 5 of main frame 1 by means best illustrated in Figs. 5 and 6. As there shown, such means include a clevis 30 which is secured to the lower portion of the block by means of a bolt 31 passing transversely through the latter, and which on the side of the block adjacent cavity 22 is provided with an offset finger 32 formed with a recess 33 to engage with the bond B just beyond the point where it enters the mold. A stud 34 projects rearwardly from the clevis, being secured to the latter by a hemispherical head 35 so that such clevis, and thus the mold M, may have a limited oscillatory movement in any direction about the stud, as well as be rotatable thereabout. The other end of the stud passes through the end of the corresponding arm 5 and is threaded to receive a nut 36 whereby the stud may be adjusted axially in the arm, a compression spring 37 being interposed between the latter and the clevis 30 so as to normally maintain the latter and thus the mold at the full distance from the arm, which adjustment of the nut permits. However, when the recessed face of the mold is pressed against the rail, the stud, subject to the pressure of said spring 37 may slide in the arm 5, being guided in such movement by a pin 38 which engages a slot or keyway 39 in the stud.

Referring further to the construction of the mold itself, the upper portion of the latter (see Figs. 5, 7 and 8) which includes the crucible, the connection 26 between such crucible and the sprue passage 24, and the upper portion of the latter, is split along a vertical plane 40 and an approximately horizontal plane 41, so that a section 42 is separable from the remainder of the mold. This separable section or gate is pivotally attached to the main body of the mold by means of two hinged members 43 and 44, the hinged joint 45 being aligned with the vertical plane 40 which divides the mold parts in question. Attached to one such hinged member is a resilient arm 46, the outer end of which is adapted when the mold parts are brought together, to snap over the other hinged part as shown in Fig. 1, and thus to securely lock the mold section 43 in closed position.

Having thus described the construction of my improved apparatus, the manner of its use will now be briefly set forth.

Figure 9:
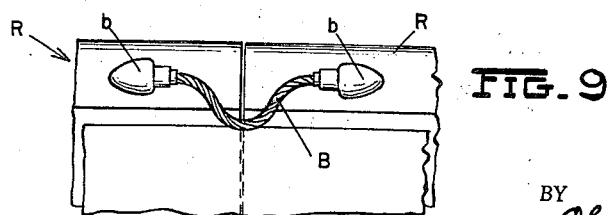
Fig. 9 shows a bond completely attached to adjoining rail ends by means of the present improved apparatus.

The bond B prior to its attachment to the rail as shown in Fig. 9, will have its respective ends secured to the corresponding molds M by the engagement of the portions of the bond adjacent such ends with the fingers 32 on the molds. The free ends of the bond are thus caused to project to desired extent in the main cavities 21 of the respective molds. By means of the handle 2 the apparatus with the bond thus affixed thereto is then placed on the rail head with the set screws 4 properly adjusted to bring the mold cavities 21 and thus such bond ends in proper vertical position. The set screw 8 in the outer end of rack member 9 will be properly adjusted so that the molds will be brought as squarely as possible against the rail head faces of the adjoining rail ends. Thereupon the handle 12 is swung to the lft as viewed in Figs. 2 and 3, until the respective molds are brought into close fitting contact with the surfaces in question and the trigger 15 will then be depressed into engagement with the rack member 9. The pressure of spring 13 is sufficient to keep the catch of such trigger in engagement until released at the end of the operation.

Figure 7:
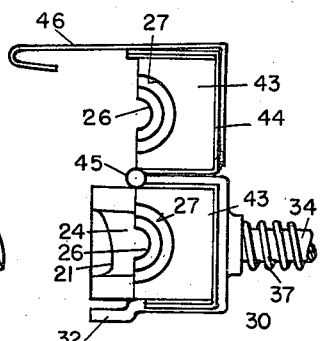
Fig. 7 is a top plan view of such mold with the parts in a different operative position from that shown in Fig. 1.
Figure 8:
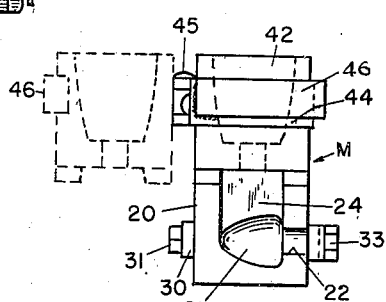
Fig. 8 is a front elevation of such mold as viewed from the left in Fig. 7.

The bond terminals may now be cast in the manner previously described, following which the movable upper section 43 of the respective molds will be swung outwardly into position shown in full lines in Fig. 7 and in dotted line in Fig. 8, thus exposing the upper portion of the sprue passage 24, its connection 26 with the crucible and, of course, opening wide the latter. As a result, the mold may be readily disengaged from the terminal cast in cavity 21 and at the same time facilitates the removal of the flux which results from the reaction and remains in the crucible, sprue passage, or the connection therebetween. The trigger 15 is now released, following which the apparatus as a whole may be readily lifted from the rail. Owing to the constricted connection between the sprue passage 24 and the main cavity 21 in the mold, any surplus of metal and solidified flux may be readily removed by chipping or the like.

It will be observed that upon bringing the main pair of molds M into contact with the rail heads of adjoining rails, should the latter, as is usual, be slightly out of alignment, the springs 37 which surround the mold-supporting studs 34 will take up any slight lateral displacement, while owing to the universal character of the connection of the molds with such studs the former will automatically adjust themselves to slightly divergent planes of contact. A tight fit between the molds and the faces of adjoining rail heads is thus assured. At the same time the apparatus is exceedingly compact so that it may be readily transported from the scene of one operation to the next, and its parts few, simple, and not likely to get out of order. A mold, of course, after a period of use, may require to be replaced, and in such case it is only necessary to remove the corresponding bolt 31, take out the worn mold and fit in a new one in the corresponding clevis 30.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. In bonding apparatus of the character described, the combination of relatively reciprocable frame and rack members, one provided with mold supporting means and the other with rail-engaging means, a spring tending to move said members in a direction to separate said means, a pinion on said frame member engaging the rack on said rack member and adapted on oscillation to draw said means together, and a mold held by said mold supporting means adapted to be clamped in close engagement with a rail by cooperative action of said rail engaging means.

2. In apparatus of the character described, the combination of a frame member provided with mold supporting means, a rack member reciprocably mounted on said frame member and provided with rail-engaging means opposed to said mold supporting means, a spring tending to move said members in a direction to separate said means, a pinion on said frame member engaging the rack on said rack member and adapted on oscillation in one direction to draw said means together, and paired molds being held by said mold supporting means in position to engage the side of a rail head through cooperative clamping action of said rail engaging means.

3. In apparatus of the character described, the combination of a handled frame member provided with mold supporting means, a rack member reciprocably mounted on said frame member and provided with rail-engaging means opposed to said mold supporting means, a spring tending to move said members in a direction to separate said means, a pinion on said frame member engaging the rack on said rack member and adapted on oscillation in one direction to draw said means together, a stop limiting oscillation of said pinion in the opposite direction, and a mold supported in said mold supporting means adapted to be held in close engagement with the side of a rail head by cooperative clamping action of said rail engaging means when said mold supporting means and said rail engaging means are drawn together by interaction of said rack and pinion.

4. In apparatus of the character described, the combination of a handled frame member provided with mold supporting means, a rack member reciprocably mounted on said frame member and provided with rail-engaging means opposed to said mold supporting means, a spring tending to move said members in a direction to separate said means, a pinion on said frame member engaging the rack on said rack member and adapted on oscillation in one direction to draw said means together, a stop limiting oscillation of said pinion in the opposite direction, a catch adapted to lock said members against relative movement, and a mold supported in said mold supporting means adapted to be held in close engagement with the side of a rail head by cooperative clamping action of said rail engaging means when said mold supporting means and said rail engaging means are drawn together by interaction of said rack and pinion.

5. In apparatus of the character described, the combination of a handled frame member provided with mold supporting means, a rack member reciprocably mounted on said frame member and provided with rail-engaging means opposed to said mold supporting means, a spring tending to move said members in a direction to separate said means, a pinion on said frame member engaging the rack on said rack member and adapted on oscillation in one direction to draw said means together, a handle connected with said pinion for oscillating same, a stop limiting oscillation of said pinion in the opposite direction, a catch adapted to lock said members against relative movement, and a mold supported in said mold supporting means adapted to be held in close engagement with the side of a rail head by cooperative clamping action of said rail engaging means when said mold supporting means and said rail engaging means are drawn together by interaction of said rack and pinion.

6. In bonding apparatus of the character described, the combination of a frame adapted to rest on a rail or the like and provided with means for engaging one side of such rail, and means carried by said frame and adapted to support a mold in position to engage the opposite side of such rail, said mold supporting means comprising a downwardly directed arm, a pin transversely slidable in said arm, and a clevis oscillatively mounted on the inner end of said pin and adapted to receive a mold.

7. In bonding apparatus of the character described, the combination of a frame adapted to rest on a rail or the like and provided with means for engaging one side of such rail, and means carried by said frame and adapted to support a mold in position to engage the opposite side of such rail, said mold supporting means comprising a downwardly directed arm, a pin transversely slidable in said arm, a clevis oscillatively mounted on the inner end of said pin and adapted to receive a mold, and a compression spring interposed between said arm and clevis.

8. In bonding apparatus of the character described, the combination of a frame adapted to rest on a rail or the like and provided with means for engaging one side of such rail, and means carried by said frame and adapted to support a mold in position to engage the opposite side of such rail, said mold supporting means comprising a downwardly directed arm, a pin keyed for slidable movement transversely of said arm, a nut threaded on the outer end of said pin to adjustably limit its movement toward such rail, a clevis oscillatively mounted on the inner end of said pin and adapted to receive a mold, and a compression spring interposed between said arm and clevis.

9. In bonding apparatus of the character described, the combination of a frame adapted to rest on a rail or the like and provided with means for engaging one side of such rail, and means carried by said frame and adapted to support a mold in position to engage the opposite side of such rail, said mold supporting means comprising a downwardly directed arm, a pin transversely slidable in said arm, and a clevis mounted on the inner end of said pin and adapted to receive a mold, said clevis being rotatable about the axis of said pin.

10. In bonding apparatus of the character described, the combination of a frame adapted to rest on a rail or the like and provided with means for engaging one side of such rail, and means carried by said frame and adapted to support a mold in position to engage the opposite side of such rail, said mold supporting means comprising a downwardly directed arm, a pin transversely slidable in said arm, and a clevis mounted on the inner end of said pin and adapted to receive a mold, said clevis being both rotatable about, and oscillatory transversely of the axis of said pin.

11. A mold for cast welding the end of a bond to a rail, said mold comprising a block of refractory material having a recessed face conforming to the face of the rail to which the bond is to be attached, the recess in such mold face comprising a main cavity wherein the terminal is cast and a smaller cavity extending to an adjacent end of the mold adapted to closely fit the body of the bond with its end extending into such main cavity, and a sprue passage leading from above to such main cavity, the upper portion of said block being split to provide a movable part adapted in one position to laterally close a portion of such passage and in another position to leave the same exposed, said movable part being hingedly connected to the main body of the block about a vertical axis.

12. A mold for cast welding the end of a bond to a rail, said mold comprising a block of refractory material having a recessed face conforming to the face of the rail to which the bond is to be attached, the recess in such mold face comprising a main cavity wherein the terminal is cast and a smaller cavity extending to an adjacent end of the mold adapted to closely fit the body of the bond with its end extending into such main cavity, and a sprue passage leading from above to such main cavity, the upper portion of said block being split to provide a movable part adapted in one position to laterally close a portion of such passage and in another position to leave the same exposed, said movable part being hingedly connected to the main body of the block about a vertical axis, and a catch adapted to retain said movable part in closed position.

13. In bonding apparatus of the character described, the combination of a frame adapted to rest on a rail or the like and provided with means for engaging one side of such rail; means carried by said frame and adapted to support a mold in position to engage the opposite side of such rail, said mold supporting means comprising a downwardly directed arm, a pin mounted in said arm for slidable movement transversely thereof, means limiting slidable movement of said pin toward such rail, a clevis oscillatively mounted on the inner end of said pin, a compression spring interposed between said arm and clevis; and a mold having a recessed face conforming to the face of the rail held in said clevis whereby said mold may engage such rail and automatically accommodate itself thereto.

14. A mold for cast welding the end of a bond to a rail, said mold comprising a block of refractory material having a rail engaging face, a main cavity in such face wherein the bond terminal is adapted to be cast, a smaller cavity extending to an adjacent end of the mold block adapted to closely fit the body of a bond with the end of such bond extending into said main cavity, a sprue passage leading from above to said main cavity, and a crucible communicating at its lower end with said sprue passage, said crucible being hingedly separable on a vertical line into two component parts.

15. A mold for cast welding the end of a bond to a rail, said mold comprising a block of refractory material having a rail engaging face, a main cavity in such face wherein the bond terminal is adapted to be cast, a smaller cavity extending to an adjacent end of the mold block adapted to closely fit the body of a bond with the end of such bond extending into said main cavity, a sprue passage leading from above to said main cavity, and a crucible communicating at its lower end with said sprue passage, said crucible being hingedly separable on a vertical line into two component halves.

NOBLE G. CARLSON.